(12) United States Patent
Sano et al.

(10) Patent No.: US 10,138,924 B2
(45) Date of Patent: Nov. 27, 2018

(54) FITTING MEMBER AND REPLACEMENT UNIT FOR LONG MEMBER

(71) Applicant: HI-LEX CORPORATION, Hyogo (JP)

(72) Inventors: Ritsu Sano, Hyogo (JP); Tomoyoshi Okada, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 15/306,341

(22) PCT Filed: Apr. 27, 2015

(86) PCT No.: PCT/JP2015/062687
§ 371 (c)(1),
(2) Date: Oct. 24, 2016

(87) PCT Pub. No.: WO2015/166909
PCT Pub. Date: Nov. 5, 2015

(65) Prior Publication Data
US 2017/0051781 A1 Feb. 23, 2017

(30) Foreign Application Priority Data
Apr. 28, 2014 (JP) .................. 2014-092638

(51) Int. Cl.
*F16C 1/10* (2006.01)
*F16C 1/14* (2006.01)

(52) U.S. Cl.
CPC ............ *F16C 1/101* (2013.01); *F16C 1/14* (2013.01); *F16C 1/145* (2013.01)

(58) Field of Classification Search
CPC ............ F16C 1/101; F16C 1/14; F16C 1/145
See application file for complete search history.

(56) References Cited

U.S. PATENT DOCUMENTS 5,836,061 A * 11/1998 Castillo .................... F16C 1/14
24/115 R
5,902,104 A 5/1999 Yamada
(Continued)

FOREIGN PATENT DOCUMENTS

GB 765877 A * 1/1957 ............. F16C 1/101
JP 6418621 1/1989
(Continued)

OTHER PUBLICATIONS

International Search Report dated Aug. 11, 2015 filed in PCT/JP2015/062687.

*Primary Examiner* — Vicky A Johnson
(74) *Attorney, Agent, or Firm* — Rankin, Hill & Clark LLP (57) ABSTRACT

The present invention relates to a fitting member (1) including an insertion portion (11) that fits a long member (Ia) therein and has a space through which the long member (Ia) is insertable, a movement restriction portion (14) that restricts movement that the long member (Ia) comes out of the insertion portion (11), the movement restriction portion (14) being capable of being scraped with a tool, and a guide portion (16) that guides the tool to the movement restriction portion (14) when the movement restriction portion (14) is scraped with the tool, the fitting member (1) including the movement restriction portion (14) that can be scraped with the tool to release the restriction of the movement that the long member (Ia) comes out of the insertion portion (11).

8 Claims, 6 Drawing Sheets

(56) References Cited

U.S. PATENT DOCUMENTS

| | | | |
|---|---|---|---|
| 2004/0136779 A1 | 7/2004 | Bhaskar | |
| 2011/0100150 A1* | 5/2011 | Tarver | F16C 1/101 74/502.4 |
| 2017/0138392 A1* | 5/2017 | Sano | F16C 1/10 |

FOREIGN PATENT DOCUMENTS

| | | | | |
|---|---|---|---|---|
| JP | H0720417 U | * | 4/1995 | F16C 1/101 |
| JP | 08277830 A | * | 10/1996 | F16C 1/101 |
| JP | 10155812 A2 | | 6/1998 | |
| JP | 2008101718 A2 | | 5/2008 | |

* cited by examiner

FITTING MEMBER AND REPLACEMENT UNIT FOR LONG MEMBER

TECHNICAL FIELD

The present invention relates to a fitting member for fitting a long member therein, the long member being capable of being removed with a tool, and a replacement unit for the long member including the fitting member.

BACKGROUND ART

Figure 7:
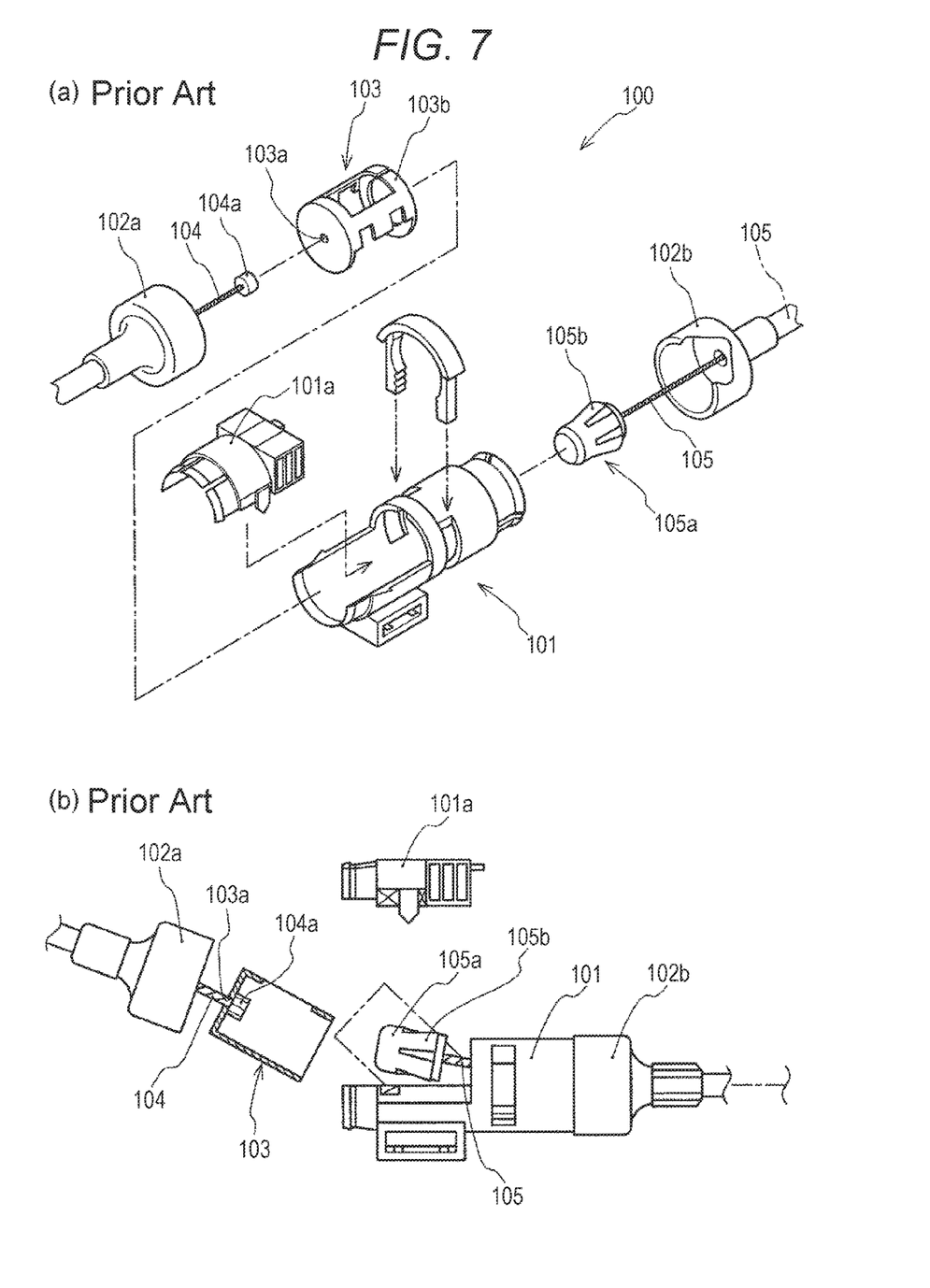
FIG. 7(a) is an exploded perspective view illustrating a known inner cable relay device including a fitting member.
FIG. 7(b) is a side view illustrating the replacement of an inner cable from the relay device of FIG. 7(a).

A relay device of an inner cable disclosed in Patent Literature 1 is known as a device including a fitting member for fitting a long member such as an inner cable therein. As illustrated in FIGS. 7(a) and 7(b), a relay device 100 disclosed in Patent Literature 1 includes a tubular casing 101, cap members 102a and 102b attached respectively to front and rear ends of the casing 101, a joint piece 103 that is slidable in the casing 101, a first inner cable 104 engaged with a front part (the left side of FIGS. 7(a) and 7(b)) of the joint piece 103, and a second inner cable 105 engaged with a rear part (the right side of FIGS. 7(a) and 7(b)) of the joint piece 103 in a manner that the second inner cable 105 can be freely engaged with and removed from the rear part. The relay device 100 is configured such that the casing 101 includes a cover piece 101a that is a part of a peripheral wall from near the center to the front end, the part being attachable and detachable, and the joint piece 103 can be removed from inside the casing 101 by removing the cover piece 101a.

The joint piece 103 includes a first engaging portion 103a in which a hole is formed to engage the first inner cable 104. The first inner cable 104 is inserted through the hole of the first engaging portion 103a. A first cable end 104a is swaged and fixed to a distal end of the first inner cable 104. The first cable end 104a is engaged with the front part of the joint piece 103 in the joint piece 103. Meanwhile, a cylindrical second cable end 105a is fixed by casting to a distal end of the second inner cable 105. The second cable end 105a includes a spring piece 105b expanding outward. The second cable end 105a including the spring piece 105b is inserted into a ring-shaped second engaging portion 103b of the joint piece 103 from the rear side thereof. Consequently, the second inner cable 105 is attached to the joint piece 103.

PRIOR ART LITERATURE

Patent Literature

Patent Literature 1: JP-A-2008-101718

SUMMARY OF THE INVENTION

Problems to be Solved

The relay device 100 described in Patent Literature 1 is configured such that the joint piece 103 can be removed from the casing 101 by removing the cover piece 101a of the casing 101 when the inner cable is replaced. When a new first inner cable 104 is attached to the casing 101 after the joint piece 103 engaging the first inner cable 104 is removed from the casing 101, a cap 102a and a first inner cable 104 with a joint piece 103 are prepared and the new cap 102a and first inner cable 104 with the joint piece 103 are attached to the casing 101.

In this manner, a long member (the first inner cable 104) such as an inner cable inserted through a round hole (the first engaging portion 103a) and fitted in a fitting member cannot be removed from the fitting member (the joint piece 103). Therefore, if there arises a need to replace an attachment target object to which the long member of one side is attached, it is necessary to replace the fitting member and the long member together in the fitted state, or to cut the joint piece 103 without damaging the long member. However, if the fitting member and the long member are replaced together, the fitting member and the already assembled long member each need to be discarded. The long member and its attachment target object, which have no problem, also need to be discarded together. Consequently, loss of resources occurs. Moreover, the joint piece 103 has physical strength to ensure the fit. Therefore, it is difficult to cut the joint piece 103. In order to perform the cutting operation without damaging the long member, a special jig or a careful operation are required. This makes the operation time long and there is a problem in the capacity of mass production. Thus, a fitting member is required to be able to release its fit easily.

Considering such problems, an object of the present invention is to provide a fitting member and a replacement unit for a long member, which can be removed from the fitting member easily.

Solutions to the Problems

A fitting member according to the present invention is a fitting member for fitting a long member therein. The fitting member includes: an insertion portion including a space through which the long member is insertable; a movement restriction portion configured to restrict movement that the long member comes out of the insertion portion, the movement restriction portion being capable of being scraped with a tool; and a guide portion configured to guide the tool to the movement restriction portion when the movement restriction portion is scraped with the tool. The restriction of the movement that the long member comes out of the insertion portion is released after the movement restriction portion is scraped with the tool.

Moreover, it is preferable that the guide portion includes opposing tapered surfaces and is formed such that the width of a space between the tapered surfaces is reduced toward the movement restriction portion.

Moreover, it is preferable that the insertion portion is a slit extending in a direction perpendicular to an axial direction of the long member, the movement restriction portion is a projection protruding from the slit to reduce the width of the slit, and the width of a projection formed part where the projection of the slit is formed is smaller than the width of the long member.

Moreover, a replacement unit for a long member according to the present invention is a replacement unit for a long member to be fitted in a fitting member. The replacement unit for a long member includes: a fitting member including an insertion portion including a space through which the long member is insertable, a movement restriction portion configured to restrict movement of the long member from the insertion portion toward a direction perpendicular to an axial direction of the long member, the movement restriction portion being capable of being scraped with a tool, and a guide portion configured to guide the tool to the movement restriction portion when the movement restriction portion is scraped with the tool, the guide portion including tapered surfaces formed such that a space between the tapered surfaces is reduced toward the movement restriction portion, the restriction of the movement toward the direction perpendicular to the axial direction of the long member being released after the movement restriction portion is scraped with the tool; and the tool configured to scrape the movement restriction portion. The tool includes tapered surfaces, the thickness between the tapered surfaces being reduced toward a distal end of the tool, the tapered surfaces of the tool being configured to be guided by the tapered surfaces of the guide portion.

Moreover, it is preferable that the insertion portion is a slit extending in the direction perpendicular to the axial direction of the long member, the movement restriction portion is a projection protruding from the slit to reduce the width of the slit, the width of a projection formed part where the projection of the slit is formed is smaller than the width of the long member, and the width of the distal end of the tool is smaller than the width of the projection formed part.

Moreover, it is preferable that the tool includes a distal end portion where the tapered surfaces are formed, and a proximal end portion, and the width of the proximal end portion of the tool is larger than the width of a slit where the projection is not formed.

Effects of the Invention

According to a fitting member of the present invention, a long member fitted in the fitting member can be easily removed from the fitting member without being cut or damaged. Moreover, according to a replacement unit for the long member, the long member fitted in the fitting member can be removed from the fitting member without being cut or damaged to replace the fitting member in which the long member is fitted.

DESCRIPTION OF THE EMBODIMENT

A fitting member and a replacement unit for a long member of the present invention are described in detail hereinafter with reference to the drawings.

The fitting member of the present invention is a member that fits the long member such as an inner cable therein. In the following embodiment, the fitting member forms a fitting structure with a cable end formed at an end of a wire, the cable end being a fitted portion of the long member. Consequently, the fitting member fits the long member therein. In the embodiment illustrated below, the long member that is fitted in the fitting member is illustrated as an inner cable of a control cable, but not only a wire for operation such as an inner cable but also another long, slender member such as a rod with an end that is fitted in the fitting member is applicable.

Moreover, applications of the fitting member are not especially limited. The fitting member is connected to, for example, a terminal of the long member and can be used for an operating force transmission mechanism that transmits, to another member, operating force by an operation from the long member. More specifically, the fitting member can be used for a relay mechanism for a vehicle seat operating apparatus and the like, an open/close mechanism for a fuel lid, an open/close mechanism for a trunk, or the like, where control cables are connected directly or indirectly to the fitting member to be interconnected to each other. Moreover, the fitting member may be applied to applications other than vehicles. Moreover, the fitting member may be used for coupling long members, or may be used for attaching one long member. "Fitting" in the description is a concept also including a state where the long member is loosely fit in a movable state in a portion of the long member, the portion being fitted into the fitting member. Moreover, the replacement unit for the long member is a unit including some members used to replace the long member, that is, a tool described below, and the fitting member. The replacement unit for the long member can replace the fitting member in which the long member is fitted. The replacement unit for the long member may be used to remove the long member fitted in the fitting member, or may be used to attach the long member to the fitting member.

The fitting member and the replacement unit for the long member of the present invention are described below taking, as an example, an operating force transmission mechanism, including the fitting member, to which operating force is transmitted by the long member, especially a relay mechanism for a seat operating apparatus. However, the present invention is not limited to the illustrated embodiment. The long member is described below as an inner cable. However, as described above, the long member is not limited to the inner cable.

Figure 1:
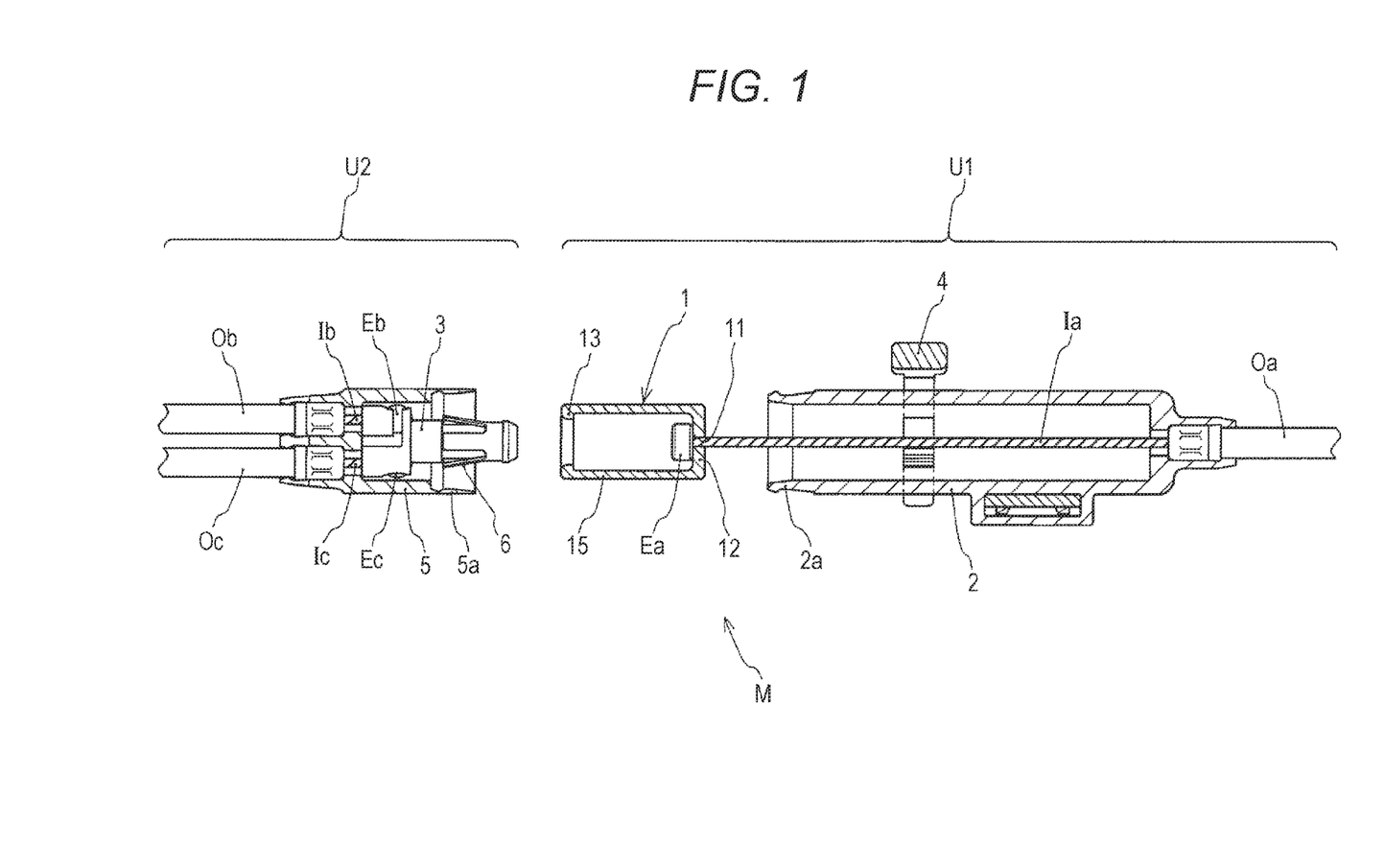
FIG. 1 is a partial cross-sectional view illustrating an operating force transmission mechanism using a fitting member according to one embodiment of the present invention.

In an embodiment illustrated in FIG. 1, an operating force transmission mechanism M includes an operating unit U1 and a connected unit U2 that is connected to the operating unit U1. The operating unit U1 is a unit in which the operating force is transmitted by an inner cable Ia. When the connected unit U2 is connected to the operating unit U1, the operating force is transmitted from the operating unit U1 further to the connected unit U2 side, or from the connected unit U2 side to the operating unit U1. In the embodiment, the connected unit U2 is provided. However, only the operating unit U1 may transmit the operating force without the connected unit U2 being provided.

As illustrated in FIG. 1, the operating unit U1 includes the inner cable Ia that transmits the operating force and a fitting member 1 in which the inner cable Ia is fitted. As illustrated in FIG. 1, the inner cable Ia extends from the inside to the outside of the fitting member 1 through an insertion portion 11. A terminal portion Ea at one end of the inner cable Ia is engaged with an inner wall of a wall portion 12 provided at one end side of the substantially tubular fitting member 1. The terminal portion Ea of the inner cable Ia is attached by, for example, casting or swaging after the inner cable Ia is inserted through the insertion portion 11. As described below, the terminal portion Ea is simply required to be attached in such a manner as that the inner cable Ia does not come out of the insertion portion 11. Moreover, in terms of the inner cable Ia, the end of the inner cable Ia is inserted through the insertion portion 11 in FIG. 1. However, a portion, which is inserted through the insertion portion 11, of the inner cable Ia (a portion that is fitted in the fitting member 1) does not need to be the end of the inner cable Ia. In other words, when a portion other than an end of the inner cable Ia, such as the center portion of the inner cable Ia, is fitted in the fitting member 1, any portion of the inner cable Ia is inserted through the insertion portion 11 of the fitting member 1 and can be fitted in the fitting member 1.

The inner cable Ia is routed between an unillustrated operating part and the fitting member 1 to transmit the operating force from the operating part to an unillustrated actuating part. The operating part is, for example, an operating lever that is operated to tilt a seat in the seat operating apparatus. However, the operating part may apply the operating force from an inner cable Ib via the inner cable Ia.

Moreover, in the embodiment, the terminal portion Ea of the inner cable Ia is engaged with the fitting member 1 as illustrated in FIG. 1. However, the inner cable Ia may be fitted in the fitting member 1 in the middle of the routing path by attaching the terminal portion Ea of the inner cable Ia to a member other than the fitting member 1 and then providing the fitting member 1 in the middle of the routing path of the inner cable Ia.

In the embodiment, as illustrated in FIG. 1, the operating unit U1 further includes an outer casing Oa through which the inner cable Ia is inserted, and a tubular housing case 2 where one end of the outer casing Oa is fixed, the housing case 2 being capable of slidably housing the fitting member 1. The inner cable Ia is inserted into the outer casing Oa in such a manner as that the outer casing Oa covers the inner cable Ia. The housing case 2 includes a lock member 4 that restricts the movement of the fitting member 1 in one direction in the housing case 2 when an attachment member 3 of the connected unit U2 described below is coupled to the fitting member 1. As a known member can be used as the lock member 4, its detailed description is omitted. When the movement of the fitting member 1 is restricted, the lock member 4 protrudes into the housing case 2 to restrict the movement of the fitting member 1 in the axial direction. Moreover, after the attachment member 3 is coupled to the fitting member 1, the lock member 4 is operated in such a manner as not to protrude into the housing case 2, and the restriction of the movement of the fitting member 1 in the housing case 2 is released. Accordingly, the fitting member 1 can be movable in the axial direction in the housing case 2.

The connected unit U2 is connected to the operating unit U1 and is used to interconnect the inner cable Ia of the operating unit U1 and the inner cable Ib and an inner cable Ic of the connected unit U2. As long as the connected unit U2 is connectable to the operating unit U1 and the operating force can be transmitted between the operating unit U1 and the connected unit U2, the structure of the connected unit U2 is not especially limited.

In the embodiment illustrated in FIG. 1, the connected unit U2 includes the attachment member 3 to be connected to the fitting member 1, the inner cables Ib and Ic each having one end connected to the attachment member 3, outer casings Ob and Oc that house the inner cables Ib and Ic, and a cap 5 to which one end of each of the outer casings Ob and Oc is attached, the cap 5 being connected to the housing case 2 of the operating unit U1. As illustrated in FIG. 1, terminal portions Eb and Ec at one end side of the inner cables Ib and Ic are engaged with the attachment member 3. In the embodiment, the two inner cables Ib and Ic are connected to the attachment member 3. However, the number of inner cables attached to the attachment member 3 is not especially limited to two, and may be one. Terminals (not illustrated) at the other end of the inner cables Ib and Ic are coupled to an unillustrated operated part (or operating part). Examples of the operated part include a lock release lever provided to a lock mechanism that locks the tilting position of the seat in a seat operating apparatus.

The attachment member 3 includes a spring piece 6. A distal end of the attachment member 3 is inserted into an engaging portion 13 including a through-hole provided to the fitting member 1. Consequently, the attachment member 3 is fit and attached in and to the fitting member 1. Moreover, an engagement portion 2a provided to an end of the housing case 2 is engaged with an engaged portion 5a provided to the cap 5 through the connection between the housing case 2 and the cap 5. Consequently, the connection between the operating unit U1 and the connected unit U2 is fixed. Moreover, the fitting member 1 can be movable in the axial direction (the left-and-right direction in FIG. 1) in the housing case 2 through the connection between the operating unit U1 and the connected unit U2. Consequently, the operating force can be transmitted from the operating part coupled to the operating unit U1 to the operated part coupled to the connected unit U2 via the inner cables Ia, Ib, and Ic.

Figure 2:
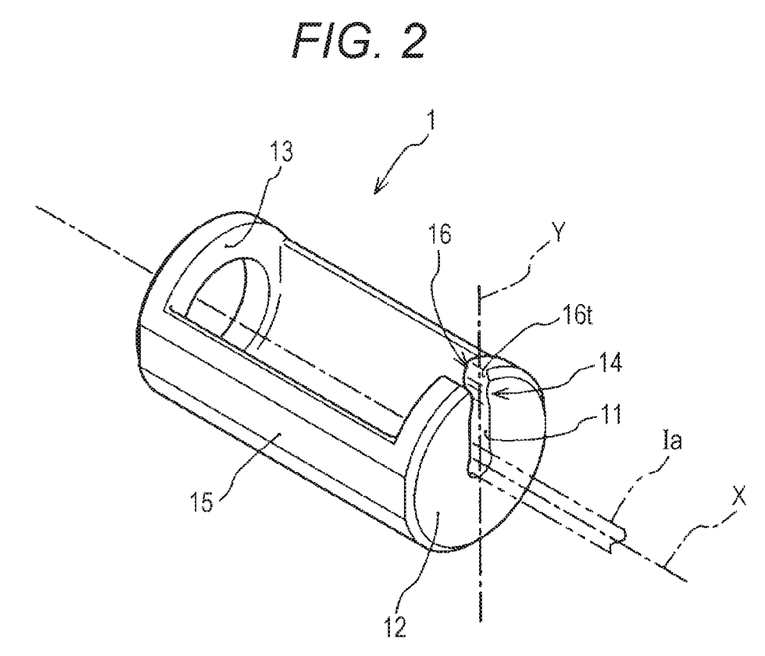
FIG. 2 is a perspective view of the fitting member of FIG. 1.
Figure 3:
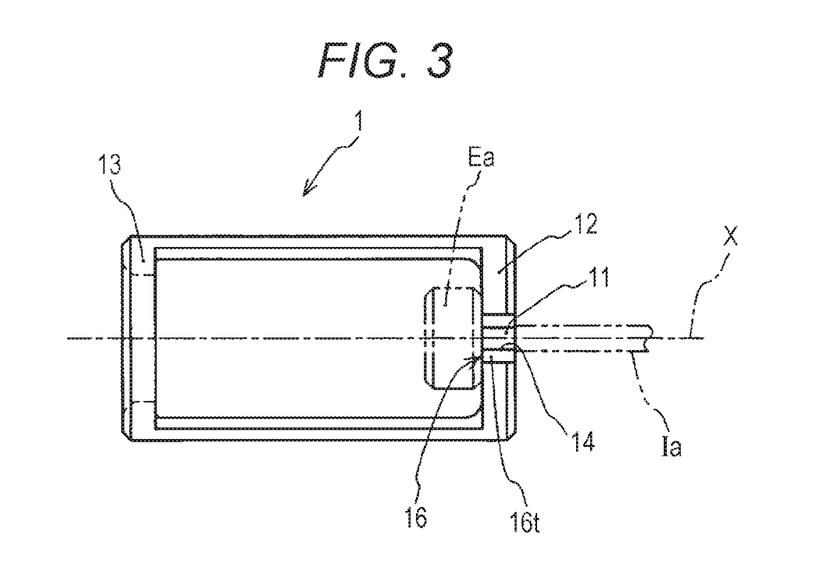
FIG. 3 is a top view of the fitting member of FIG. 1.
Figure 4:
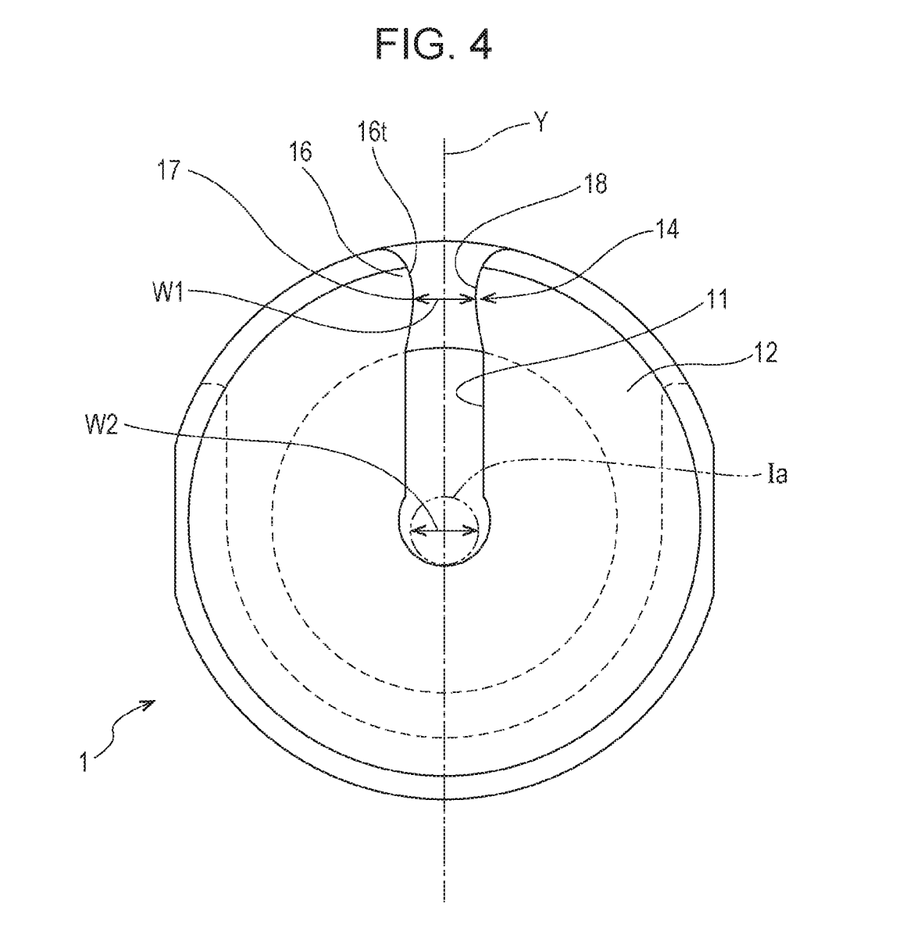
FIG. 4 is a side view of the fitting member of FIG. 1 as viewed from a wall portion side where an insertion portion is provided.

Next, the fitting member 1 of the present invention is described. The fitting member 1 includes the insertion portion 11 through which the inner cable Ia is insertable, and a movement restriction portion 14 as illustrated in FIGS. 2 to 4. The movement restriction portion 14 restricts the movement of the inner cable Ia in a direction where the inner cable Ia comes out of the insertion portion 11. The movement restriction portion 14 can be scraped with a tool T (see FIG. 5) described below.

In the embodiment, the fitting member 1 is also connected, as a joint piece that interconnects the inner cable Ia and the inner cables Ib and Ic, to another member such as the attachment member 3. The fitting member 1 of the embodiment has a substantially cylindrical shape as illustrated in FIGS. 2 and 3, a part of a side surface of the tube being cut away. The fitting member 1 includes, on one end thereof, the wall portion 12 where the insertion portion 11 and the movement restriction portion 14 are formed. The fitting member 1 includes, on the other end thereof, the through-hole and the ring-shaped engaging portion 13, to which the attachment member 3 of the connected unit U2 is connected. Moreover, the fitting member 1 includes a housing portion 15 in which the attachment member 3 and the terminal portion Ea of the inner cable Ia are housed, between the wall portion 12 and the engaging portion 13. The shape of the fitting member 1 illustrated in FIGS. 2 to 4 is merely an example. The fitting member 1 is simply required to include the insertion portion 11, the movement restriction portion 14, and a guide portion 16 described below. The fitting member 1 may be a plate-shaped member such as a bracket. Alternatively, the fitting member 1 may be formed integrally with another member and provided as a part of another member.

The insertion portion 11 is a portion through which the inner cable Ia is inserted. The insertion portion 11 is formed penetrating the wall portion 12 of the fitting member 1 such that the inner cable Ia can be insertable therethrough. In the embodiment, as illustrated in FIGS. 2 and 4, the insertion portion 11 is illustrated as a slit extending in a direction Y perpendicular to a direction of an axis X of the inner cable Ia. More specifically, the wall portion 12 is notched in a substantially U-shape to form one slit with the continuous insertion portion 11, movement restriction portion 14, and guide portion 16 described below. However, the insertion portion 11 may include a communicating portion linking from a sliding portion to the movement restriction portion 14, in addition to the sliding portion configured such that the inner cable Ia is insertable therethrough and movable mainly in the axial direction. The insertion portion 11 may have another shape such as a circular shape, an oval shape, or a rectangular shape as long as the insertion portion 11 is configured to have a space through which the inner cable Ia being the long member is insertable, the inner cable Ia being capable of coming out of the fitting member 1 when the movement restriction portion 14 described below is scraped.

The inner cable Ia is inserted through the insertion portion 11 in a loosely fit state. Furthermore, for example, when the insertion portion 11 is slit-like as illustrated in FIGS. 2 and 4, the insertion portion 11 may be not only the location through which the inner cable Ia indicated by a chain double dashed line is actually inserted but also from a position where the inner cable Ia is actually inserted to a position where the movement of the inner cable Ia is restricted by the movement restriction portion 14.

Figure 5:
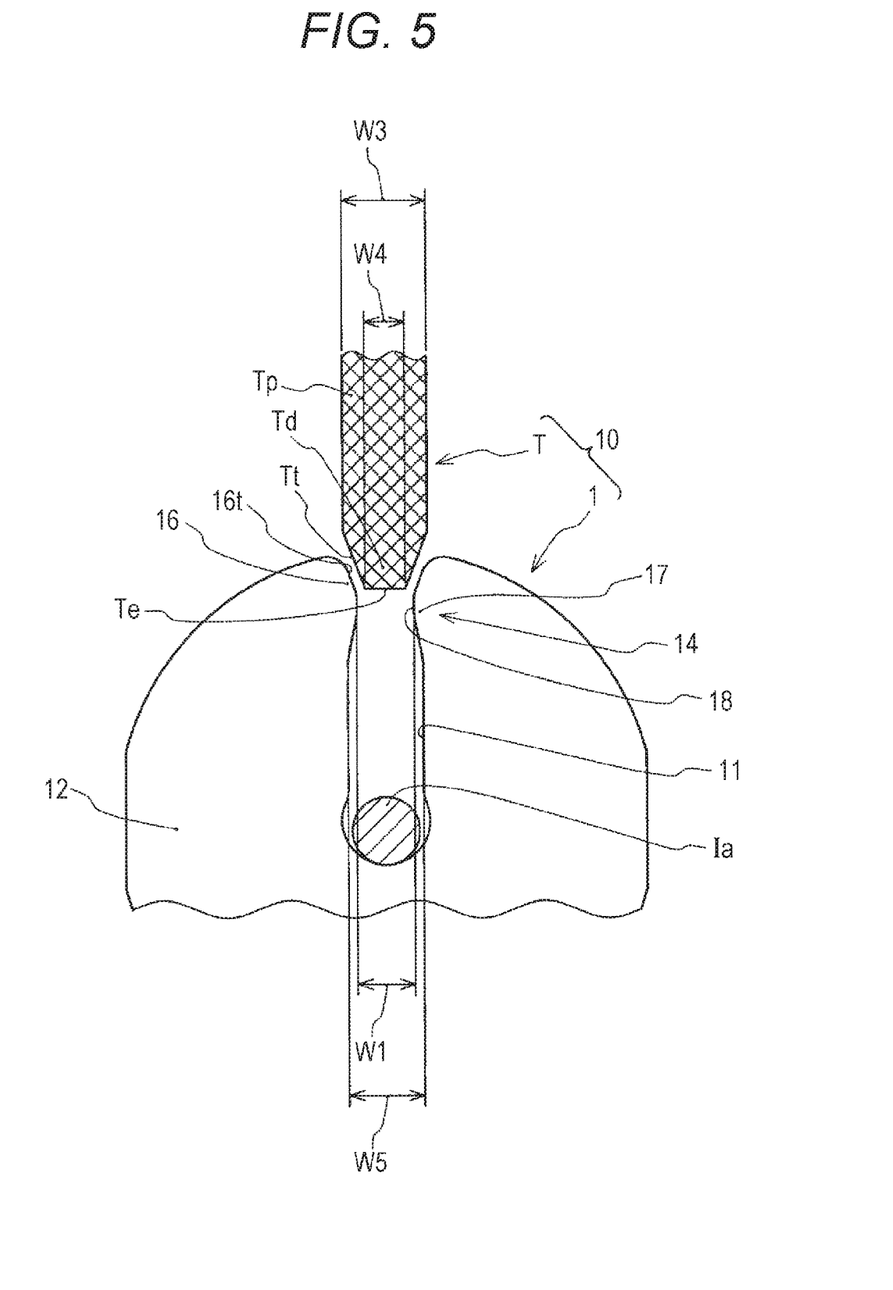
FIG. 5 is a schematic side view illustrating a replacement unit for a long member according to one embodiment of the present invention.

As illustrated in FIGS. 2 and 4, the movement restriction portion 14 is provided at a position adjacent to the insertion portion 11. The movement restriction portion 14 restricts the movement of the inner cable Ia from the insertion portion 11 toward the direction Y perpendicular to the direction of the axis X of the inner cable Ia in such a manner as that the inner cable Ia does not come out of the insertion portion 11 by moving in the direction perpendicular to the axial direction of the long member. In the embodiment, the movement restriction portion 14 is projections 17 protruding from the slit-like insertion portion 11 to reduce the width of the slit as illustrated in FIGS. 2, 4, and 5. The movement restriction portion 14 is configured such that a space width W1 (see FIG. 4) of a narrowed portion 18 where the projections 17 are formed is smaller than a width W2 (see FIG. 4) of the inner cable Ia. The space width W1 between the projections is smaller than the width W2 of the inner cable Ia; accordingly, the inner cable Ia can be kept from coming out of the insertion portion 11. The movement restriction portion 14 is not limited to the embodiment as long as the movement restriction portion 14 is configured to be able to keep the inner cable Ia from coming out of the insertion portion 11. For example, as illustrated in FIGS. 2 to 4, the insertion portion 11 may communicate with the outside of the fitting member 1 in the Y direction perpendicular to the direction of the axis X within a range that the inner cable Ia does not come out. Although not illustrated, the movement restriction portion 14 may be provided in such a manner as to completely block the direction Y side perpendicular to the direction of the axis X within a range that permits scraping, as described below. Moreover, when the movement restriction portion 14 is formed as projections, the projections may be formed to be continuous projections along the direction of the axis X as illustrated in FIGS. 2 and 3. These projections may be hemispheric. In the embodiment, the width W1 of the narrowed portion formed by the projections is a width between a pair of opposing projections provided on both side surfaces that form the slit. When only one of the side surfaces of the slit is provided with a projection, the width between the projection provided to the one side surface and a portion facing the projection on the other side surface is the width W1 of the narrowed portion.

The movement restriction portion 14 is configured to be able to be scraped with the tool T. The material of the movement restriction portion 14 is not especially limited as long as the material can be scraped with the tool T, but the movement restriction portion 14 is formed of metal or synthetic resin that can be scraped with the tool T. It is simply required that at least the movement restriction portion 14 is able to be scraped with the tool T. There is no need to configure the entire fitting member 1 in such a manner as to be able to be scraped. The details of the tool T are described below. The tool T include, for example, a file that can scrape the movement restriction portion 14 manually or electrically in such a manner as that the inner cable Ia can move to come out of the insertion portion 11. The movement restriction portion 14 can be scraped with the tool T. Consequently, upon transport to a place for assembling a vehicle or the like in a state where the inner cable Ia is fitted in the fitting member 1 as in the state illustrated in FIG. 1, the transport is possible without the fitting member 1 and the inner cable Ia being separated. Moreover, there is a case where it is necessary to remove the inner cable Ia from the fitting member 1 at the time of an inspection for failure in the operating unit U1, the connected unit U2, or the like, or at the time of replacement of the inner cable Ia. In this case, the movement restriction portion 14 is scraped, and therefore the inner cable Ia can be easily removed from the fitting member 1 without being cut. Furthermore, the movement restriction portion can be manually scraped. Thus, the fitted state can be easily released.

Moreover, as illustrated in FIGS. 2 to 4, the fitting member 1 includes the guide portion 16 that guides the tool T to the movement restriction portion 14 when the movement restriction portion 14 is scraped with the tool T. The guide portion 16 enables the tool T to easily scrape the movement restriction portion 14. The guide portion 16 is a portion that comes into contact with the tool T and guides the tool T in such a manner as to bring a portion, which scrapes the movement restriction portion 14, of the tool into contact with the movement restriction portion. The guide portion 16 is provided adjacently to the movement restriction portion 14 to guide the tool T to the movement restriction portion 14. In the embodiment, the guide portion 16 is provided adjacent to the movement restriction portion 14 on the direction Y side perpendicular to the direction of the axis X as illustrated in FIGS. 2 to 4. However, as long as the guide portion 16 is located at a position adjacent to the movement restriction portion 14, the position allowing the guide portion 16 to guide the tool T to the movement restriction portion 14, the position of the guide portion 16 relative to the movement restriction portion 14 is not especially limited. For example, the guide portion 16 may be provided at a position adjacent to the movement restriction portion 14 in the direction of the axis X (for example, on the left and right sides of the movement restriction portion 14 in FIG. 3). In other words, the guide portion 16 may be provided in such a manner as to guide the tool T to the movement restriction portion 14 substantially perpendicularly (parallel to the axis X) to the wall portion 12 of the fitting member 1.

The shape of the guide portion 16 is not especially limited as long as it is a shape that can guide the tool T. It is preferable that tapered surfaces 16t, the width between which is reduced toward the movement restriction portion 14, are formed as illustrated in FIGS. 2 to 5 in the embodiment. As illustrated in FIGS. 2 to 6, in the case where the guide portion 16 extends outward (a direction away from the axis X in the direction Y perpendicular to the direction of the axis X) from the slit-like insertion portion 11 via the movement restriction portion 14 and an opening that opens outward is provided in the guide portion 16, when the width of the opening of the guide portion 16 having the tapered surfaces 16t is larger than the tool T, the tool T is easily guided to the movement restriction portion 14. Therefore, a distal end Te (see FIG. 5) of the tool T can be stably guided to the movement restriction portion 14. The tapered surface 16t of the guide portion 16 may have a flat shape or a curved surface shape as long as the tapered surface 16 has a shape such that the tapered surface 16 can guide the distal end Te of the tool T to the movement restriction portion 14. Moreover, the taper angle of the tapered surface 16t is not especially limited. It is preferable that the shape of the guide portion 16 substantially agree with the shape of the portion, which is used to scrape the movement restriction portion 14, of the tool T since the movement restriction portion 14 can be easily scraped with the tool T simply by mating the tool T with the guide portion 16.

As described above, the fitting member 1 includes the movement restriction portion 14 that can be scraped with the tool T, and the guide portion 16 that guides the tool T to the movement restriction portion 14. The fitting member 1 is configured to release the restriction of the movement of the inner cable Ia in the direction Y perpendicular to the direction of the axis X after the movement restriction portion 14 is scraped with the tool T. With this configuration, the movement restriction portion 14 keeps the inner cable Ia inserted through the insertion portion 11 from coming out of the fitting member 1 before the movement restriction portion 14 is scraped with the tool T, and upon transport of the operating unit U1 including the fitting member 1, and the like, the fitting member 1 and the inner cable Ia are not separated from each other. Especially, as in the above-mentioned relay mechanism that interconnects inner cables, when the operating unit U1 and the connected unit U2 are transported separately upon transport, and another member is assembled to the fitting member 1 after the transport, the fitting member 1 can be kept from being detached from the inner cable Ia and from being lost.

Figure 6:
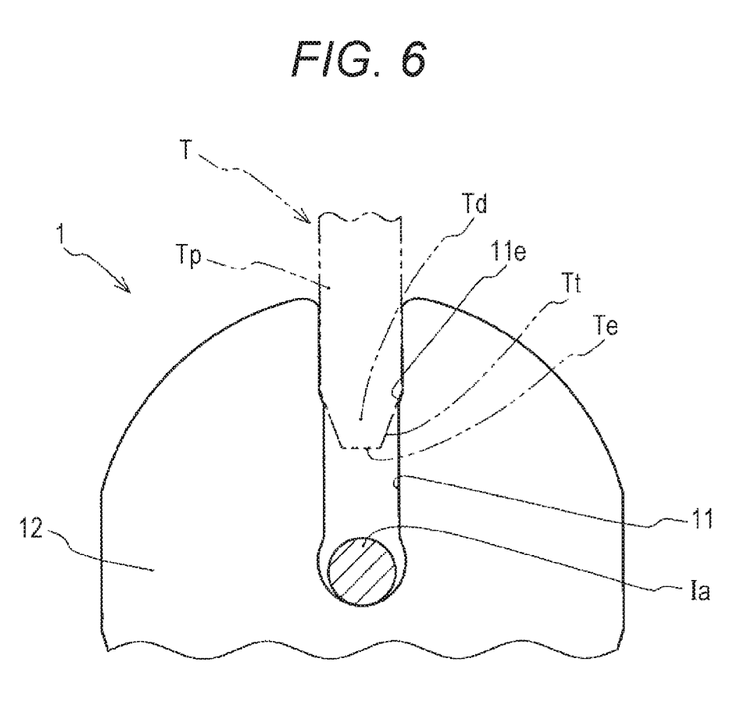
FIG. 6 is a schematic side view illustrating a state where a movement restriction portion of the fitting member illustrated in FIG. 5 is scraped with a tool.

Moreover, at the time of an inspection for failure in such a mechanism using the fitting member 1 after the fitting member 1 is assembled, such as the operating unit U1 and the connected unit U2, or in the case when it is necessary to replace the inner cable Ia, it is necessary to remove the inner cable Ia from the fitting member 1. In such a case, the movement restriction portion 14 can be scraped with the tool T. Consequently, the inner cable Ia can be easily removed without being cut. Therefore, when there is no failure in the inner cable Ia and other members after the inspection, the inner cable Ia can be reused, which negates the need for undesired cutting. When the inner cable Ia is cut, a terminal on an opposite side to the terminal portion Ea of the inner cable Ia attached to the fitting member 1 also needs to be removed from the operating part. However, when there is no need to replace the inner cable Ia, it is possible to save time and effort to remove the terminal on the opposite side. Thus, the workability of an inspection or the like is improved. Especially in a case of the relay mechanism that interconnects inner cables, such as the seat operating apparatus, the inner cable Ia is routed avoiding other members placed in the vehicle. Both terminals of the inner cable Ia are attached at distant positions in the vehicle. Therefore, to remove both terminals of the cut inner cable and replace the inner cable although there is actually nothing wrong with the inner cable and the cutting of it is unnecessary is extremely complicated. On the other hand, in the case of the embodiment, there is a case where an inspection operation or the like can be completed only with the relay connection portion of the inner cable without cutting the inner cable. Thus, the workability improves. Moreover, after the movement restriction portion 14 is scraped with the tool T, a larger passage than the width W2 of the inner cable Ia is secured in the fitting member 1 whose movement restriction portion 14 has been scraped, as illustrated in FIG. 6. Therefore, when the inner cable Ia is attached again, or when a replacement with a new inner cable Ia is made, the fitting member 1 whose movement restriction portion 14 has been scraped can be reused and there is no need to prepare a new fitting member 1. Thus, the fitting member 1 is economical, and the workability also improves. In the case of the relay device that interconnects the inner cables of the seat operating apparatus, with regard to a vehicle seat, for example, a seat cushion and a seatback are attached separately in a vehicle. After attached to the inside of the vehicle, the inner cable Ia and the inner cables Ib and Ic, which are attached to the seat cushion and the seatback, are attached to the fitting member 1. Here, if there is a need to adjust the attachment positions of the seat cushion and the seatback, the movement restriction portion 14 of the fitting member 1 is manually removed with the tool T; accordingly, the inner cable Ia can be removed from the fitting member. Consequently, the coupling with the seat cushion and the seatback is released to enable the adjustment of the attachment positions to the vehicle body. After the adjustment is complete, the inner cable Ia is fitted again in the fitting member 1; accordingly, it is possible to interconnect the inner cable Ia and the inner cables Ib and Ic.

Moreover, when the fitting member 1 includes the slit-like insertion portion 11, the long, slender, slit-like insertion portion 11 ensures a predetermined distance between a lower end of the insertion portion 11 (a portion where the inner cable Ia is located in FIG. 5) and the movement restriction portion 14 to be scraped with the tool T. Therefore, when the movement restriction portion 14 is scraped with the tool T, it is possible to reduce damage to the inner cable Ia due to the tool T wrongly coming into contact with the inner cable Ia. Moreover, when the guide portion 16 includes the tapered surfaces 16t, the tapered surfaces 16t of the guide portion 16 guide the tool T to the movement restriction portion 14. Therefore, the position of the distal end Te of the tool T is stabilized by the guide portion 16. The width W1 of the narrowed portion of the movement restriction portion 14 that restricts the movement of the inner cable Ia is smaller than the width W2 of the inner cable Ia. An operation to manually guide the distal end Te of the tool T to such a small space in the movement restriction portion 14 is difficult. However, the guide portion 16 with the tapered surfaces 16t is provided to guide the tool T to the movement restriction portion 14. The movement restriction portion 14 is then scraped with the tool T. The tapered surfaces 16t of the guide portion 16 allow the tool T to proceed toward the insertion portion 11 in such a manner as to gradually scrape the movement restriction portion 14. Hence, it becomes easy to guide the tool T to the movement restriction portion 14. Therefore, the operation of scraping the movement restriction portion 14 with the tool T becomes easy.

When the movement restriction portion 14 of the fitting member 1 is scraped in this manner to remove or replace the inner cable Ia, the replacement is further facilitated by using a replacement unit 10 for the inner cable Ia as illustrated in FIG. 5. As illustrated in FIG. 5, the replacement unit 10 includes the fitting member 1 and the tool T that scrapes the movement restriction portion 14. As described above, the tool T is a tool for scraping the movement restriction portion 14. A rod-shaped or plate-shaped file can be used as the tool T. The tool T of the embodiment includes a distal end portion Td where a tapered surface Tt is formed and a proximal end portion Tp continuous from the distal end portion Td toward a handle of the tool T, as illustrated in FIG. 5. A side, which is much closer to the handle, of the proximal end portion Tp is provided with a proximal end portion connection portion for the unillustrated handle portion or the like. Cutting teeth are formed respectively on surfaces of the distal end portion Td and the proximal end portion Tp to enable the scraping of the movement restriction portion 14.

In the fitting member 1 used for the replacement unit 10, the tapered surfaces 16t, the width between which is reduced toward the movement restriction portion 14, are formed on the guide portion 16. As illustrated in FIG. 5, the tool T includes the tapered surface Tt reduced in width toward the distal end Te of the tool T. The fitting member 1 is configured to guide the tapered surface Tt of the tool T by the tapered surfaces 16t of the guide portion 16. The tapered surface Tt of the tool T may have a flat shape or a curved surface shape as long as the width of the tool T is reduced toward the distal end Te. Moreover, the taper angle of the tapered surface Tt of the tool T is not especially limited as long as it is an angle that allows the tool T to be guided by the tapered surfaces 16t of the guide portion 16. The tapered surface Tt of the tool T is guided by the tapered surfaces 16t of the guide portion 16. Consequently, it is easy to insert the distal end Te of the tool T into the small space in the guide portion 16. Hence, the tool T can be securely guided to the movement restriction portion 14. Therefore, the workability is improved by mating the tapered surface Tt of the tool T with the tapered surfaces 16t of the guide portion 16. In addition, it is possible to reduce damage to the inner cable Ia due to the distal end Te of the tool T deviating from the guide portion 16. In other words, the tapered surface Tt of the tool T is guided by the tapered surfaces 16t of the guide portion 16 to stabilize the distal end Te of the tool T along the tapered surfaces 16t of the guide portion 16. When the guide portion 16 is not provided, the distal end Te of the tool T is unstable during the operation of scraping the movement restriction portion 14 with the tool T. The distal end Te of the tool T deviates in the direction of the axis X. As a result, the distal end Te of the tool T may come into contact with the inner cable Ia. On the other hand, the tapered surface Tt of the tool T is guided by the tapered surfaces 16t of the guide portion 16. Consequently, the distal end Te of the tool T is stabilized. The deviation of the distal end Te of the tool T in the direction of the axis X can be suppressed. As a result, the contact between the inner cable Ia and the tool T can be further reduced. Moreover, when the tapered surface Tt of the tool T and the tapered surface 16t of the guide portion 16 have substantially the same taper angle, the tapered surface Tt of the tool T comes into surface contact with the tapered surfaces 16t of the guide portion 16. When the tool T is moved, the movement restriction portion 14 can be easily scraped.

Moreover, as illustrated in FIG. 5, the insertion portion 11 of the fitting member 1 is formed in the shape of a slit in the embodiment. The tool T is configured such that a width W3 of the distal end Te of the distal end portion Td of the tool T is smaller than the width W1 of the narrowed portion of the movement restriction portion 14. When the width W3 of the distal end Te of the tool T is smaller than the width W1 of the narrowed portion of the movement restriction portion 14, the distal end Te of the tool T is easily fitted into the space in the movement restriction portion 14 as illustrated in FIG. 5. Therefore, the operation of the tool T is stabilized. As a result, it becomes easy to scrape the movement restriction portion 14. Moreover, the distal end Te of the tool T is fitted between the projections of the movement restriction portion 14. The tapered surface Tt of the tool T is guided by the tapered surfaces 16t of the guide portion 16. Therefore, the tool T is guided by the tapered surfaces 16t of the guide portion 16, and also it is hard for the distal end Te of the tool T to come out from between the projections of the movement restriction portion 14 during the scraping operation. Therefore, the operation of scraping the movement restriction portion 14 with the tool T is facilitated.

Moreover, as illustrated in FIG. 5, a width W4 of the proximal end portion Tp of the tool T may be configured to be larger than a width W5 of a portion of a slit where the projections are not formed. The width W4 of the proximal end portion Tp of the tool T is larger than the width W5 of the portion of the slit where the projections are not formed. Consequently, after the movement restriction portion 14 is scraped with the tool T, it is hard for the tool T to go deep into the slit-like insertion portion 11 as indicated by a chain double dashed line in FIG. 6. Conversely, when the width W4 of the proximal end portion Tp of the tool T is smaller than the width W5 of the slit-like insertion portion 11, nothing hinders the proximal end portion Tp of the tool T from moving in a direction toward the inner cable Ia after the movement restriction portion 14 is completely scraped. In this case, when force toward the inner cable Ia is applied to the tool T, the tool T may go down deep in the slit-like insertion portion 11 and come into contact with the inner cable Ia. On the other hand, in the case where the width W4 of the proximal end portion Tp of the tool T is larger than the width W5 of the slit-like insertion portion 11, when the movement restriction portion 14 is scraped, the distal end portion Td of the tool T proceeds into the insertion portion 11 as illustrated in FIG. 6. However, when the scraping is performed until the width W1 of the narrowed portion of the movement restriction portion 14 becomes equal to the width W5 of the slit-like insertion portion 11, the movement of the distal end portion Td further toward the insertion portion 11 is suppressed because the width W4 of the proximal end portion Tp of the tool T is larger than the width W5 of the slit-like insertion portion. In other words, an edge lie created by the scraping of the slit-like insertion portion 11 resists to control insertion of tool T toward the inner cable Ia with great force. Therefore, damage to the inner cable Ia caused by the tool T can be more securely reduced. Furthermore, the distal end portion Td of the tool T has a smaller width than the proximal end portion Tp. The distal end portion Td is tapered down as illustrated in FIG. 5. Therefore, when the proximal end portion Tp of the tool T scrapes the slit-like insertion portion 11 such that the insertion portion has a larger width than the width W5 as illustrated in FIG. 6, the distal end portion Td of the tool T is not in contact with an inner wall of the slit-like insertion portion 11 except the edge 11e as illustrated in FIG. 6. Consequently, scraping the inner wall of the slit-like insertion portion 11 by the distal end portion Td of the tool T is prevented. It is hard to form a rough surface on the inner wall of the insertion portion 11 after the movement restriction portion 14 of the fitting member 1 is scraped. Therefore, when the inner cable Ia is reinserted through the insertion portion 11, damage to the inner cable Ia caused by the inner wall of the insertion portion 11 is reduced. As a result, damage to the inner cable Ia can be reduced.

LIST OF NUMERAL REFERENCES

1 Fitting member
10 Replacement unit

11 Insertion portion
11e Edge
12 Wall portion
13 Engaging portion
14 Movement restriction portion
15 Housing portion
16 Guide portion
16t Tapered surface of the guide portion
17 Projection
18 Narrowed portion
2 Housing case
2a Engagement portion
3 Attachment member
4 Lock member
5 Cap
5a Engaged portion
6 Spring piece
Ea, Eb, Ec Terminal portion of an inner cable
Ia, Ib, Ic Inner cable
M Operating force transmission mechanism
Oa, Ob, Oc Outer casing
T Tool
Td Distal end portion
Te Distal end of the tool
Tp Proximal end portion
Tt Tapered surface of the tool
U1 Operating unit
U2 Connected unit
W1 Space width of the narrowed portion
W2 Width of the inner cable
W3 Width of the distal end of the tool
W4 Width of the proximal end portion of the tool
W5 Width of a slit
X Axis of the inner cable
Y Direction perpendicular to a direction of the axis X

The invention claimed is:

1. A fitting member for fitting a long member therein, the fitting member comprising:
    an insertion portion including a space through which the long member is insertable;
    a movement restriction portion configured to restrict movement that the long member comes out of the insertion portion, the movement restriction portion being capable of being scraped with a tool; and
    a guide portion configured to guide the tool to the movement restriction portion when the movement restriction portion is scraped with the tool, wherein
    the restriction of the movement of the long member is released after the movement restriction portion is scraped with the tool,
    the insertion portion, the movement restriction portion, and the guide portion are formed as one continuous slit, and
    the one continuous slit extends in a direction perpendicular to an axis of the long member.

2. The fitting member according to claim 1, wherein the guide portion includes opposing tapered surfaces and is formed such that a space between the tapered surfaces is reduced toward the movement restriction portion.

3. The fitting member according to claim 2, wherein the insertion portion is a slit extending in a direction perpendicular to an axial direction of the long member, the movement restriction portion is a projection protruding from the slit to reduce the width of the slit, and the space width of a narrowed portion having the width of the slit reduced by the projection is smaller than the width of the long member.

4. The fitting member according to claim 1, wherein the insertion portion is a slit extending in a direction perpendicular to an axial direction of the long member, the movement restriction portion is a projection protruding from the slit to reduce the width of the slit, and the space width of a narrowed portion having the width of the slit reduced by the projection is smaller than the width of the long member.

5. A replacement unit for a long member to be fitted in a fitting member, comprising:
    a fitting member including an insertion portion including a space through which the long member is insertable, a movement restriction portion configured to restrict movement of the long member from the insertion portion toward a direction perpendicular to an axial direction of the long member, the movement restriction portion being capable of being scraped with a tool, and a guide portion configured to guide the tool to the movement restriction portion when the movement restriction portion is scraped with the tool, the guide portion including tapered surfaces formed such that the tapered surfaces are opposed each other and a space between the tapered surfaces is reduced toward the movement restriction portion, the restriction of the movement of the long member being released after the movement restriction portion is scraped with the tool; and
    the tool configured to scrape the movement restriction portion, wherein
    the tool includes tapered surfaces, the thickness between the tapered surfaces being reduced toward a distal end of the tool, the tapered surfaces of the tool being configured to be guided by the tapered surfaces of the guide portion,
    the insertion portion, the movement restriction portion, and the guide portion are formed as one continuous slit, and
    the one continuous slit extends in a direction perpendicular to an axis of the long member.

6. The replacement unit for the long member according to claim 5, wherein
    the insertion portion is a slit extending in the direction perpendicular to the axial direction of the long member,
    the movement restriction portion is a projection protruding from the slit to reduce the width of the slit,
    the space width of a narrowed portion having the width of the slit reduced by the projection is smaller than the width of the long member, and
    the width of the distal end of the tool is smaller than the space width of the narrowed portion.

7. The replacement unit for the long member according to claim 6, wherein
    the tool includes a distal end portion where the tapered surfaces are formed, and a proximal end portion, and
    the width of the proximal end portion of the tool is larger than the width of a slit where the projection is not formed.

8. The replacement unit for the long member according to claim 5, wherein
    the tool includes a distal end portion where the tapered surfaces are formed, and a proximal end portion, and the width of the proximal end portion of the tool is larger than the width of a slit where the projection is not formed.

* * * * *